United States Patent
Constant

[15] 3,691,557
[45] Sept. 12, 1972

[54] SYSTEM FOR IDENTIFYING OBJECTS USING AN ENCODING ARRAY FOR EACH OBJECT

[72] Inventor: James Nickolas Constant, 1603 Danbury Dr., Claremont, Calif. 91711

[22] Filed: Sept. 22, 1969

[21] Appl. No.: 870,598

[52] U.S. Cl. ............343/6.5 SS, 343/5 CM, 343/6.8, 343/713, 343/812
[51] Int. Cl. ...............................................G01s 9/56
[58] Field of Search........343/6.5 SS, 6.8, 5 CM, 713, 343/810, 812

[56] References Cited

UNITED STATES PATENTS

| | | | |
|---|---|---|---|
| 2,197,601 | 4/1940 | Wolaver | 343/713 |
| 3,178,711 | 4/1965 | Case, Jr. | 343/5 CM |
| 3,247,509 | 4/1966 | Hamann et al. | 343/6.5 SS |
| 3,414,902 | 12/1968 | Shaw, Jr. | 343/713 |
| 3,521,280 | 7/1970 | Janco et al. | 343/6.8 X |

Primary Examiner—Malcolm F. Hubler
Attorney—Harris, Kiech, Russell & Kern

[57] ABSTRACT

A system for identifying binary coded objects. A passive encoding array for an object and having dipoles at selected dipole locations in the array, and a synthetic aperture radar for scanning the arrays as the objects move relative to the radar. The radar output is a pulse train with pulses corresponding to dipoles of arrays illuminated by the radar.

5 Claims, 4 Drawing Figures

INVENTOR
JAMES N. CONSTANT

SYSTEM FOR IDENTIFYING OBJECTS USING AN ENCODING ARRAY FOR EACH OBJECT

This invention relates to the identification of objects which have been encoded and more particularly to the identification of objects using radar techniques in which the object being examined moves relative to the radar source and is passively encoded.

In many instances it is desirable to identify a particular object. Typical examples are in the fields of transportation, manufacturing, inventory control, postal sorting, etc. In these fields it often happens that the objects are of like kind and are either indistinguishable, too numerous or separated in distance to be rapidly identified using conventional means. Therefore, a suitable device, such as a radar encoding array, must be provided to accomplish their rapid identification. The radar encoding array permits the object being examined by a radar to be identified using conventional radar techniques.

Three examples of encoding arrays presently in use are based on magnetic, electronic or optical principals for their operation. In each of these types of devices the main criteria which determine their effectiveness are physical size, contrast and resolution. Physical size of the encoding array determines to a great extent the physical size of the observing instrument and must be constrained in dimension to some fraction of the size of the object to which it is attached in such a manner so as to assure compatibility, efficiency and economy of use. Contrast is a term which denotes the ability of the observing instrument to detect the encoding array and determine its code in the general presence of influences or reflections from the object itself. The term resolution is most frequently used to denote the smallest extension within the encoding array which the observing instrument is able to separate or differentiate.

In a magnetic encoding array, the resolution which can be obtained is critically limited to a short range of the observing instrument. In an electronic encoding array, the resolution is similarly limited while the contrast which can be obtained is limited by the material opaqueness of the object being observed. In an optical encoding array, the contrast and resolution obtained are limited by both the range of the observing instrument and by the physical properties of the lens system employed by the observing instrument and also by the wavelength. In each case above, the attainment of a satisfactory physical size for the encoding array, contrast and resolution is accomplished at extremely short range at which the observing instrument operates and/or at the expense of added cost and sophistication.

The present invention is directed to an encoding array which is highly efficient and which overcomes many of the problems and limitations present in magnetic, electronic and optical encoding arrays. In accordance with the present invention the object to be identified is coded by means of a passive encoded array which is attached to the object. The encoding array in accordance with the present invention has high contrasting and resolving powers as well as compatible physical size for both the encoding array and the observing instrument.

Utilizing the system of the present invention data may be obtained from an object which will permit its identification either in real or stored time.

It is therefore an objective of this invention to provide an efficient passive encoding array which can be attached to the object being examined.

Another objective of this invention is to provide a system capable of identifying objects.

A further objective of this invention is to provide a system with compatible physical size, high contrasting and resolving powers and capable of operating at unlimited range separations between the observing instrument and the object being observed.

Other objectives of the present invention will become more apparent upon consideration of the following specifications and annexed drawings, in which.

Figure 1:
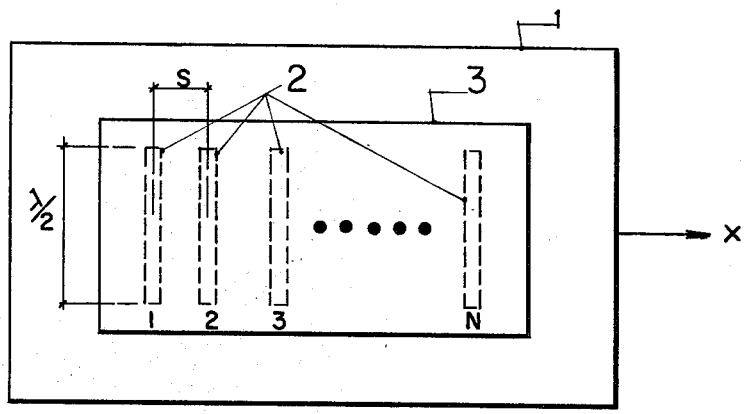
FIG. 1 is a detailed top view of the radar encoding array.

In order to describe the radar encoding array reference is made to FIG. 1. Attached to the object being examined 1 is a preferable configuration of this invention given as an array of metallic dipoles 2 embedded in a suitable dielectric material 3. Other possible configurations for this invention may be etched metallic lines on a dielectric base or painted metalic lines on a painted dielectric. The dipole lengths are $\lambda/2$ where $\lambda$ is the radar system wavelength and consequently the dipoles are resonant at the transmitted frequency. The spacings between dipoles is determined by the observing radar resolving capability. The height $h$ of the dipoles above the object being examined 1 (not shown in the figure) and the nature of the dielectric material 3 are determined by well known considerations of contrast between encoding array dipoles 2 and the object being examined 1, when both are simultaneously illuminated by the radar. THe number of dipole locations $N = n + m$ where $n$ is the number of binary digits and $m$ is the number of redundant digits in the particular error correcting coding scheme employed. The number of dipoles which actually occupy locations $M \leq N$ according to the particular coding assignment which is used to identify the object being observed. Thus although $N$ dipole locations are available, in general, some dipole locations will be vacant of dipoles in a given typical radar encoding array.

Figure 2:
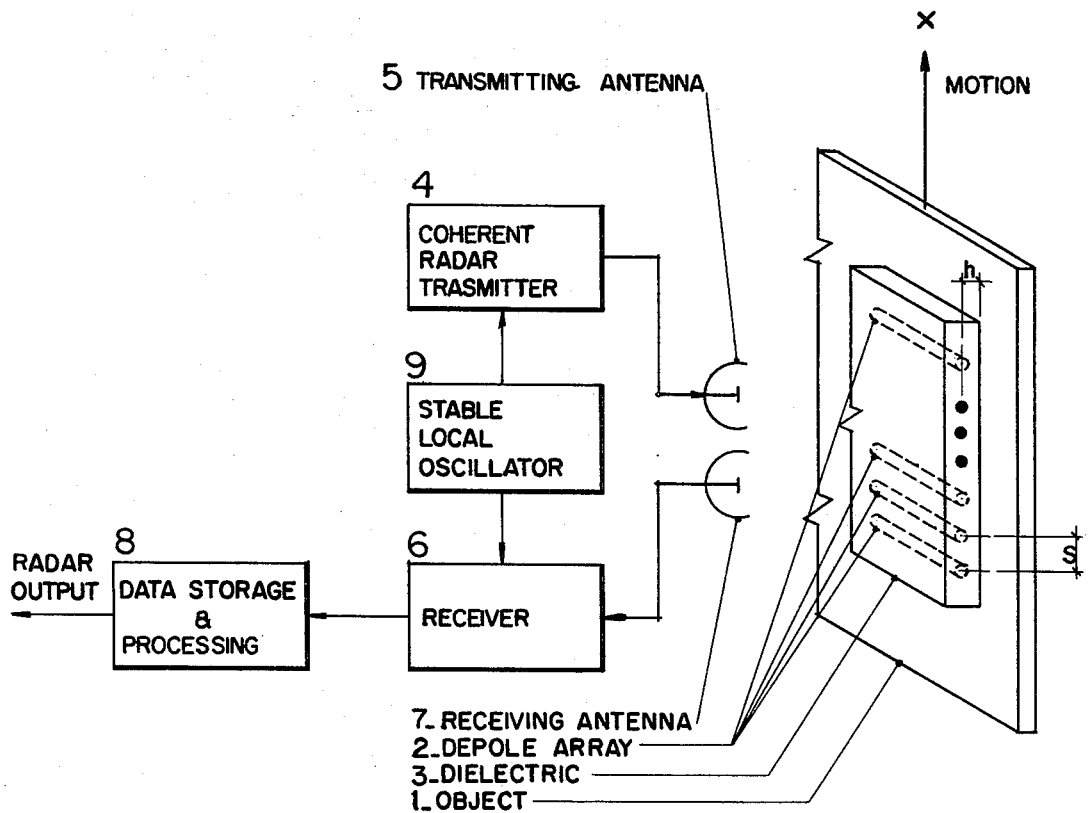
FIG. 2 is a block diagram of a conventional radar system which employs the radar encoding array.

Referring to FIG. 2 the radar encoding system in a preferable configuration consists of the object being observed 1, dipole array 2, dielectric 3, radar transmitter 4, transmitting antenna 5, receiver 6, receiving antenna 7, and data processor 8. The first three items constitute the radar encoding array while the remaining items collectively constitute a synthetic aperture radar which is a well known radar technique. A stable oscillator 9 serves as a common reference source for both the transmitter and the receiver; i. e. the radar is coherent. The synthetic radar may be any one of any number of types subject only to the constraints imposed in its use in conjunction with a radar encoding array and is not an objective of the present invention. The transmitter 4 produces a signal having a frequency which is located preferably in the radar band portion of electromagnetic frequencies. The frequency of the transmitter is preferably fixed. The exact frequency used in any one case is determined by the application at hand. Any of the well known types of radio frequency transmitters capable of producing oscillations at the needed frequencies may be utilized, the particular type of oscillator and associated radar circuits forming no part of the present invention. In the radar encoding system just described, the object being observed 1 moves in the azimuthal direction $x$ relative to the radar and with velocity.

Figure 3:
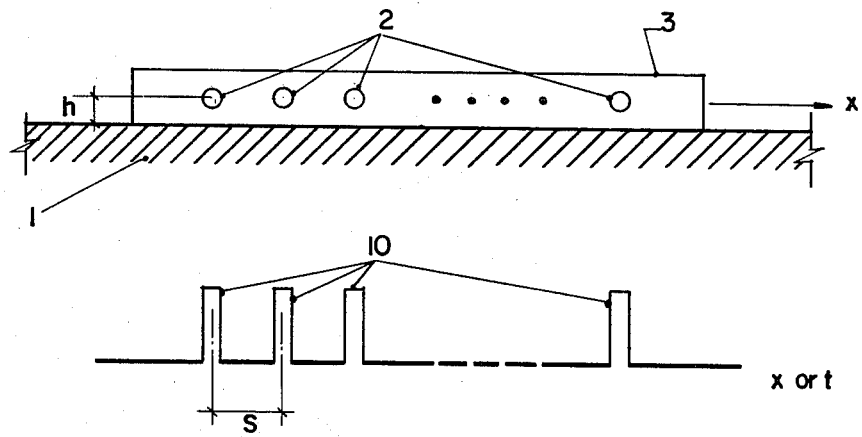
FIG. 3 is a time plot which illustrates the relationships existing between the encoding array and radar output pulses.

In order to describe the nature of the output signal which results from the motion of the radar encoding array and its detection by the radar encoding system reference is made to FIG. 3. A well known fact of a synthetic aperture radar is that the doppler shift $f_d$ is proportional to the distance $x$ between the target and the radar line of sight. Mathematically, $$f_d = 2vx/\lambda R \quad (1)$$

where $v$ = velocity of target in azimuthal direction $x$ (direction perpendicular to radar line of sight)

$\lambda$ = wavelength $R$ = range to target

Therefore, at any range $R$, the doppler shift $f_d$ is a linear function of $x$ and a frequency analysis of the return displays the radar reflectivity of the object which is being illuminated as a function of $x$. The instantaneous radar signals each with doppler shift $f_d$ are stored and then collectively processed following a given period of time T. If the object being observed (1), with attached dipole array 2 and dielectric 3, move in a direction perpendicular to the radar line of sight in the azimuthal direction $x$, and is illuminated and observed by the radar for a total period of T seconds then the radar as a matter of fact will provide a pulse for each non-vacant dipole location as a function of $x$. An elementary conversion of the pulse train can be made as a function of time. Thus a digital pulse train 10 which indicates the precise code employed in the encoding array and which conveys the needed information appears at the radar output.

Figure 4:
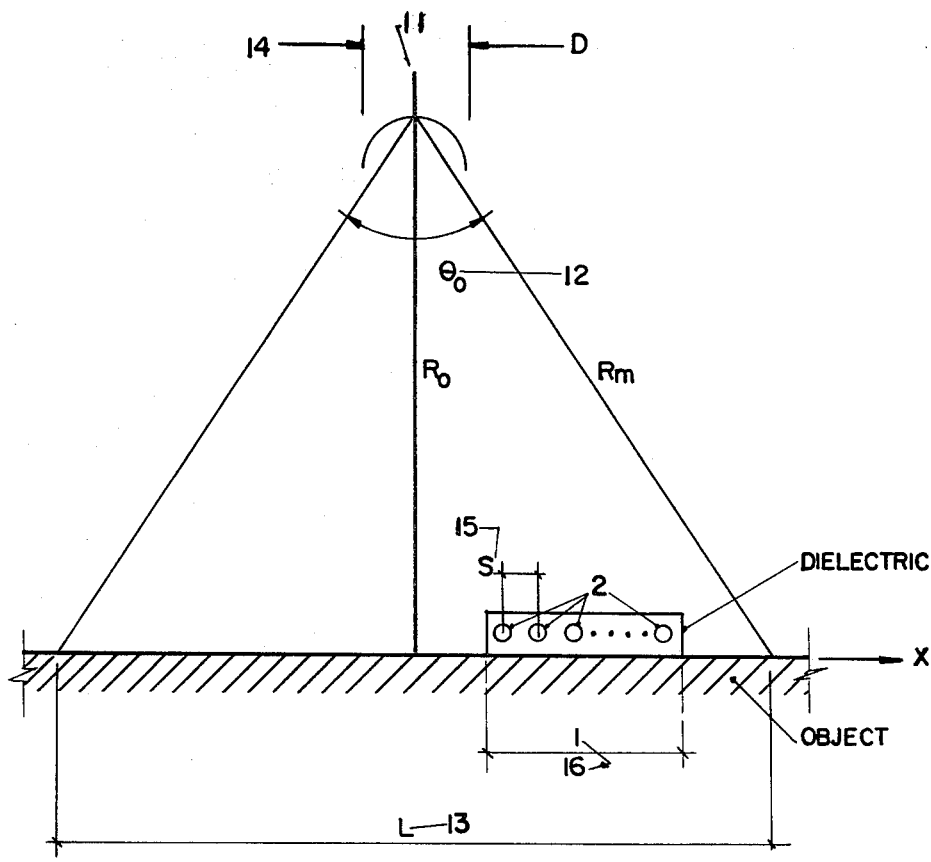
FIG. 4 is a description of the basic system geometry.

The basic geometry of the system operation is described in FIG. 4. The dipole array 2 moves in the azimuthal direction $x$ relative to the radar 11. $R_o$ is the shortest slant range of approach between the encoding array and the radar and $R_m$ is the maximum slant range which is being illuminated. The slant range resolution is given by the well known formula $$\rho_R = c\tau/2 \quad (2)$$

where $c$ = velocity of light $\tau$ = pulsewidth

In a simple pulsed radar, the generation of a pulse $\tau$ seconds requires a transmitter bandwidth of the order $W = 1/\tau$ Hz and preservation of the range resolution requires that the receiver also have bandwidth $W = 1/\tau$. The key to achieving fine range resolution is wideband radar transmitters and receivers, a well known fact in pulse compression technology. If the azimuthal antenna pattern has a half power angular width of $\theta_o$12 radians then the illuminated width or length of object track at range $R_o$, L 13, is:

$$L = \theta_o R_o \quad (3)$$

If the distance $L$ is accepted as a measure of the along track resolution and therefore determining the spacing $s$ of dipoles for this radar, then the only recourse for achieving fine resolution is to make either $\theta_o$ or $R_o$ very small. But, an antenna aperture with along track dimension D 14, operating at its diffraction limit at wavelength $\lambda$, yields a half power beamwidth of $$\theta_o = \lambda/D \text{ radians} \quad (4)$$

Therefore, the spacing for dipoles in the case for a simple radar is:

$$s = \lambda R_o/D \quad (5)$$

To keep the spacing s 15 small, $D$ must be increased and/or $\lambda$ and $R_o$ must be decreased. Each of these options becomes unattractive beyond certain limits. Large D antennas are both costly and physically incompatible with many operations; operation at very short wavelength leads to weather limitations in many cases; operation at very short range is limited by the transmitter "on-time" and may not be compatible with many applications. The simple radar system, therefore, has the potential to achieve fine range resolution, but appears to be constrained to relatively poor azimuthal resolution especially at long operating ranges. The simple radar is not a preferable configuration in this invention. The synthetic-aperture radar technique can, however, improve azimuthal resolution and, therefore, is a preferable configuration for this invention. In this technique, the physical antenna is regarded as one element of a linear array occupying in time sequence all the elemental positions of the extended array whose effective length $L$ is:

$$L = vt \quad (6)$$

where $v$ is the velocity of passage of the encoding array in the field of view of the radar in the azimuthal direction $x$. It is therefore possible to synthesize an aperture of length $L$ by suitably receiving the signal, as a function of time, before processing the data. The "synthetic" or "effective" angular beamwidth of such a technique is:

$$\theta = \lambda/L \text{ radians} \quad (7)$$

and a corresponding improvement in the along track resolution is, since $L D$, obtained. Therefore, the spacing for dipoles in the case for the synthetic aperture radar is:

$$s = \lambda R_o/L \quad (8)$$

If the length $L$ 13 is identified as the azimuthal length of the object being observed and $l$ 16 is identified as the azimuthal length of the encoding array, then by using equation (3), the last equation yields the remarkable property that the along track resolution and consequently the spacing of dipoles is independent of range and wavelength and equals the antenna dimension $D$. Thus, $$s = D \quad (9)$$

Using the synthetic aperture radar technique, therefore, allows for a significant improvement in the spacing of dipoles $s$ in the encoding array. A shortening of dipole spacing can be accomplished by reducing the antenna dimension $d$ which is exactly opposite to what happens in the case of the simple radar, as given by equation (5).

Although a particular encoding array structure has been described, it should be understood that the scope of the invention should not be considered to be limited by the particular embodiment of the invention shown by way of illustration, but rather by the appendant claims.

I claim:

1. In a system for identifying objects with a binary code, the combination of:

a plurality of passive encoding arrays with an array for each object, each of said arrays having a plurality of dipole locations with dipoles disposed at selected locations, with the presence and absence of dipoles at dipole locations comprising a binary code for the object; and a coherent synthetic aperture radar including transmitter, receiver, local oscillator and data processor, said transmitter including an antenna for directing the transmitter output to a zone where an array moves relative to the radar, with the dipoles resonating when illuminated by the transmitter, said receiver including an antenna for receiving signals from resonating dipoles, with said oscillator providing a common reference frequency for said transmitter and receiver, and with said data processor having the receiver output as an input for providing a digital pulse train with a pulse for each dipole of an array illuminated by the transmitter.

2. A system as defined in claim 1 wherein said dipoles of an array are electrical conductors of uniform length and positioned in a dielectric.

3. A system as defined in claim 1 wherein the spacing of dipole locations of an array for a system operating at a particular wavelength and frequency is substantially equal to the antenna aperture along the path of relative motion of radar and array.

4. A system as defined in claim 1 wherein said dipoles are disposed substantially parallel to each other and are of a length substantially equal to one-half the wavelength of the operating frequency of the transmitter output.

5. A system as defined in claim 1 wherein the spacing of dipole locations is substantially a linear dependence of the antenna aperture along the path of relative motion of the radar and array and is substantially independent of wavelength and range.

* * * * *